(12) United States Patent
Ingle et al.

(10) Patent No.: US 8,356,145 B2
(45) Date of Patent: Jan. 15, 2013

(54) MULTI-STAGE MULTIPLEXING OPERATION INCLUDING COMBINED SELECTION AND DATA ALIGNMENT OR DATA REPLICATION

(75) Inventors: Ajay A. Ingle, Austin, TX (US); Jen Tsung Lin, San Diego, CA (US); Rahul R. Toley, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 12/688,091

(22) Filed: Jan. 15, 2010

(65) Prior Publication Data

US 2011/0179242 A1    Jul. 21, 2011

(51) Int. Cl.
   *G06F 5/01*    (2006.01)
(52) U.S. Cl. .................. 711/154; 711/E12.015; 708/209
(58) Field of Classification Search .................. 711/154, 711/E12.015; 708/209
   See application file for complete search history.

(56) References Cited

U.S. PATENT DOCUMENTS

| | | | |
|---|---|---|---|
| 4,583,199 A | 4/1986 | Boothroyd et al. | |
| 5,627,773 A | 5/1997 | Wolrich et al. | |
| 5,761,469 A | 6/1998 | Greenley | |
| 5,822,620 A | 10/1998 | Malik et al. | |
| 5,907,865 A | 5/1999 | Moyer | |
| 6,539,467 B1* | 3/2003 | Anderson et al. ............. | 711/219 |
| 6,622,242 B1 | 9/2003 | Steele, Jr. et al. | |
| 6,754,791 B1 | 6/2004 | Braceras et al. | |
| 7,197,625 B1 | 3/2007 | van Hook et al. | |
| 2003/0002474 A1 | 1/2003 | Alexander et al. | |
| 2003/0131029 A1* | 7/2003 | Bandy et al. .................... | 708/209 |
| 2005/0099841 A1* | 5/2005 | Mukund et al. ................ | 365/154 |
| 2007/0088772 A1* | 4/2007 | Nunes et al. ................... | 708/209 |
| 2009/0138534 A1* | 5/2009 | Lee et al. ....................... | 708/209 |
| 2010/0306291 A1* | 12/2010 | Craske ........................... | 708/209 |

FOREIGN PATENT DOCUMENTS

TO    0695998 A2    2/1996

OTHER PUBLICATIONS

International Search Report and Written Opinion—PCT/US2011/021342—ISA/EPO—Apr. 29, 2011.

* cited by examiner

*Primary Examiner* — Hal Schnee
(74) *Attorney, Agent, or Firm* — Peter M. Kamarchik; Nicholas J. Pauley; Jonathan T. Velasco

(57) ABSTRACT

A multi-stage multiplexing operation that includes combined selection and data alignment or data replication is disclosed. In a particular embodiment, a method includes performing a first stage of a multi-stage multiplexing operation. During the first stage, a first data source is selected from a first plurality of data sources. At least one of a first data alignment operation and a first data replication operation is also performed on first data from the selected first data source during the first stage.

30 Claims, 8 Drawing Sheets

MULTI-STAGE MULTIPLEXING OPERATION INCLUDING COMBINED SELECTION AND DATA ALIGNMENT OR DATA REPLICATION

I. FIELD

The present disclosure is generally related to multi-stage multiplexing operations.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices such as wireless telephones typically include data storage devices such as a memory. Executing instructions (e.g., processor instructions) at electronic devices that operate on data residing in memory generally involves three separate phases. In a first phase, the desired data is selected and retrieved from the memory. In a second phase, the selected data is manipulated (e.g., aligned, sign or zero-padded, sign or zero-extended, or replicated). In a third phase, the manipulated data is operated on in accordance with the instruction. The first phase and second phase may take multiple processor cycles. Thus, in some cases, retrieving and preparing the data that is to be operated on may take longer (i.e., more processor cycles) than operating on the data to obtain the desired result of the instruction.

III. SUMMARY

Systems, methods, and computer-readable storage media are disclosed that provide a data loading and storing process in which data selection may be performed concurrently with data manipulation. Data manipulation may include data replication (e.g., replicating one or more words, half-words, or bytes of data) or data alignment (e.g., shifting data left, shifting data right, sign or zero-extending data, or sign or zero-padding data). One or more stages of a multi-stage multiplexing operation used to retrieve data from memory may concurrently select from between multiple data sources as well as modify (e.g., via data replication or data alignment) data from the selected data source. Thus, data retrieval and data manipulation may be integrated, resulting in potential performance improvement in memory-related operations.

In a particular embodiment, a method is disclosed that includes, during a first stage of a multi-stage multiplexing operation, selecting a first data source from a plurality of data sources. The method also includes, during the first stage, performing at least one of a first data alignment operation and a first data replication operation on first data retrieved from the selected first data source.

In another particular embodiment, an apparatus includes a memory including a plurality of data sources. The apparatus also includes a load aligner configured to selectively perform at least one of a data alignment operation and a data replication operation on multiple segments of a double word retrieved from one of the plurality of data sources. A multiplexing operation is also performed on the plurality of data sources. The data alignment operation or the data replication operation is performed concurrently with the multiplexing operation.

In another particular embodiment, an apparatus includes sign or zero extension logic configured to selectively sign or zero extend multiple segments of a double word retrieved from one of a plurality of data sources. The sign or zero extension is performed concurrently with a multiplexing operation.

In, another particular embodiment, an apparatus, includes a plurality of means for storing data. The apparatus also includes load aligner means for selectively performing at least one of a data alignment operation and a data replication operation on multiple segments of a double word retrieved from one of the plurality of means for storing data in parallel with performing a multiplexing operation on the plurality of means for storing data. The apparatus also includes extension means for selectively sign extending or zero extending multiple segments of the double word in parallel with the multiplexing operation. The apparatus further includes padding means for selectively sign padding or zero padding the multiple segments of the double word in parallel with the multiplexing operation.

In another particular embodiment, a computer-readable medium is disclosed. The computer-readable medium includes microprocessor instructions, that when executed by a microprocessor, cause the microprocessor to execute a first stage of a multi-stage multiplexing operation. Executing the first stage includes performing a first partial multiplexing operation that includes selection of a first data source from a first plurality of data sources. Executing the first stage also includes performing at least one of a first data alignment operation and a first data replication operation on first data received from the selected first data source. The first data alignment operation or the first data replication operation is performed at a word level with respect to the first data.

One particular advantage provided by at least one of the disclosed embodiments is an ability to select and manipulate (e.g., via alignment or replication) data during a single stage of a multi-stage multiplexing operation. Another particular advantage provided by at least one of the disclosed embodiments is a reduction in processor cycles to retrieve, select, and prepare data to be operated on by an execution unit in accordance with a microprocessor instruction.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
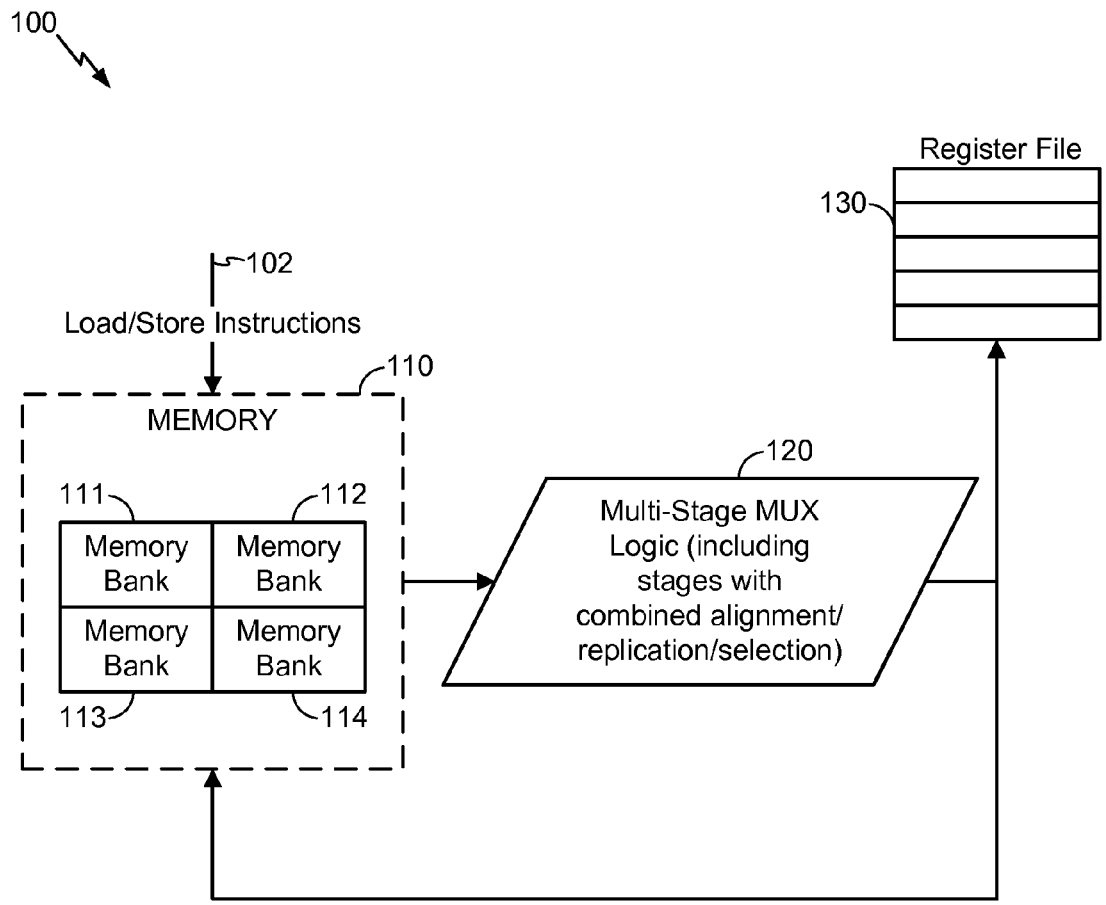
FIG. 1 is a block diagram of a particular illustrative embodiment of a system of performing a multi-stage multiplexing (MUX) operation, including stages with combined data alignment or data replication.

Referring to FIG. 1, a particular illustrative embodiment of a system of performing a multi-stage multiplexing (MUX) operation including stages with combined data alignment, data replication, and data selection is disclosed and generally designated 100. The system 100 includes a memory 110 and multi-stage multiplexing (MUX) logic 120 configured to retrieve and manipulate (e.g., via alignment and replication) data stored at the memory 110. The logic 120 is also configured to store the manipulated data to the memory 110 and to a register file 130.

In a particular embodiment, the memory 110 is accessible via load and store instructions 102. For example, the load and store instructions 102 may be microprocessor instructions of a microprocessor and the system 100 may be integrated into an execution unit of the microprocessor. The load and store instructions 102 may include a memory address of data to be retrieved, a memory offset of the data to be retrieved, a size (e.g., number of bytes or bits) of the data to be retrieved, a sign or zero extension bit, a sign or zero padding bit, a left or right shift bit, or any combination thereof. For example, a particular load instruction may request that data stored at a particular address of the memory 110 be retrieved and stored in a particular register of the register file 130. In a particular embodiment, the memory 110 is divided into memory banks For example, the memory 110 may be divided into four memory banks 111, 112, 113, and 114, as illustrated in FIG. 1. In a particular embodiment, each of the memory banks 111-114 stores 64-bit double words. Each 64-bit double word may include two 32-bit words, each 32-bit word may include two 16-bit half words, and each 16-bit half word may include two 8-bit bytes.

The logic 120 is configured to perform a multi-stage MUX operation with respect to data retrieved from the memory 110. The multi-stage MUX operation includes two or more stages. In a particular embodiment, the multi-stage MUX operation includes three stages, and each of the three stages includes both data selection operations and data manipulation operations. The logic 120 is also configured to store the data retrieved from the memory 110 back to the memory 110 and to the register file 130. Thus, in a particular embodiment, the logic 120 may be used to relocate data from a first address at the memory 110 to a same or second address at the memory 110. A particular embodiment of the logic 120 is further described with reference to FIG. 2 and FIG. 4.

The register file 130 may include one or more registers configured to store data. For example, the register file 130 may be a 64-bit register file including multiple 64-bit registers, each register configured to store a 64-bit data item. In a particular embodiment, the register file 130 is used to store data retrieved from the memory 110 before microprocessor operations (e.g., Add, Subtract, logical AND, logical OR) are performed on the retrieved data. The register file 130 may also be used to store the results of microprocessor operations.

In operation, one or more load or store instructions 102 may trigger a multi-stage MUX operation with respect to data stored at the memory 110. For example, during a first stage of the multi-stage MUX operation, the logic 120 may select between a first double word (e.g., 64 bits) retrieved from the first memory bank 111 and a second double word retrieved from the second memory bank 112. The logic 120 may also select between a third double word retrieved from the third memory bank 113 and a fourth double word retrieved from the fourth memory bank 114. The logic 120 may further perform, in parallel with the data selection, word-level (e.g., 32 bits) data manipulation operations (e.g., sign extension, zero padding, and alignment) on the selected data. Thus, the first stage of the multi-stage MUX operation may produce a first selected double word from either the first memory bank 111 or the second memory bank 112, and a second selected double word from either the third memory bank 113 or the fourth memory bank 114, where both the first selected double word and the second selected double word have undergone data manipulation.

During a second stage of the multi-stage MUX operation, the logic 120 may select from between the first selected double word and the second selected double word produced during the first stage. The logic 120 may also perform half-word-level (e.g., 16 bits) data manipulation operations (e.g., sign extension, zero padding, and alignment) on the selected data. Thus, the second stage of the multi-stage MUX operation may produce a double word from one of the four memory banks 111-114, where the double word has undergone selective data manipulation at both a word-level and a half-word-level. Data manipulation may include data replication (e.g., replicating one or more words, half-words, or bytes of data) or data alignment (e.g., shifting data left, shifting data right, sign or zero-extending data, or sign or zero-padding data). It should be noted that in certain situations data alignment may not involve altering an original alignment of the data. For example, the data retrieved from the memory 110 may already be aligned at a desired word boundary. Illustrative data manipulation operations are further described with reference to FIG. 6.

During a third stage of the multi-stage MUX operation, the logic 120 may perform further data manipulation (e.g., sign or zero-extension, sign or zero-padding, and alignment) at a byte-level on the double word, or selected portions of the double word, produced by the second stage. For example, the resulting final data may include two replicated words, at least two replicated half-words, at least one sign extension byte, at least one zero padding byte, at least two replicated bytes, at least one realigned byte, or a combination thereof. Upon conclusion of the third stage, the resulting final data may be stored back to the memory 110 or to the register file 130, as requested by the load or store instruction 102.

It will be appreciated that the system 100 of FIG. 1 may enable combined data selection and data manipulation (e.g., via alignment or replication) during a single stage of a multi-stage MUX operation. It will thus be appreciated that the system 100 of FIG. 1 may reduce processor cycles to retrieve, select, and prepare data to be operated on in accordance with a microprocessor instruction.

Figure 2:
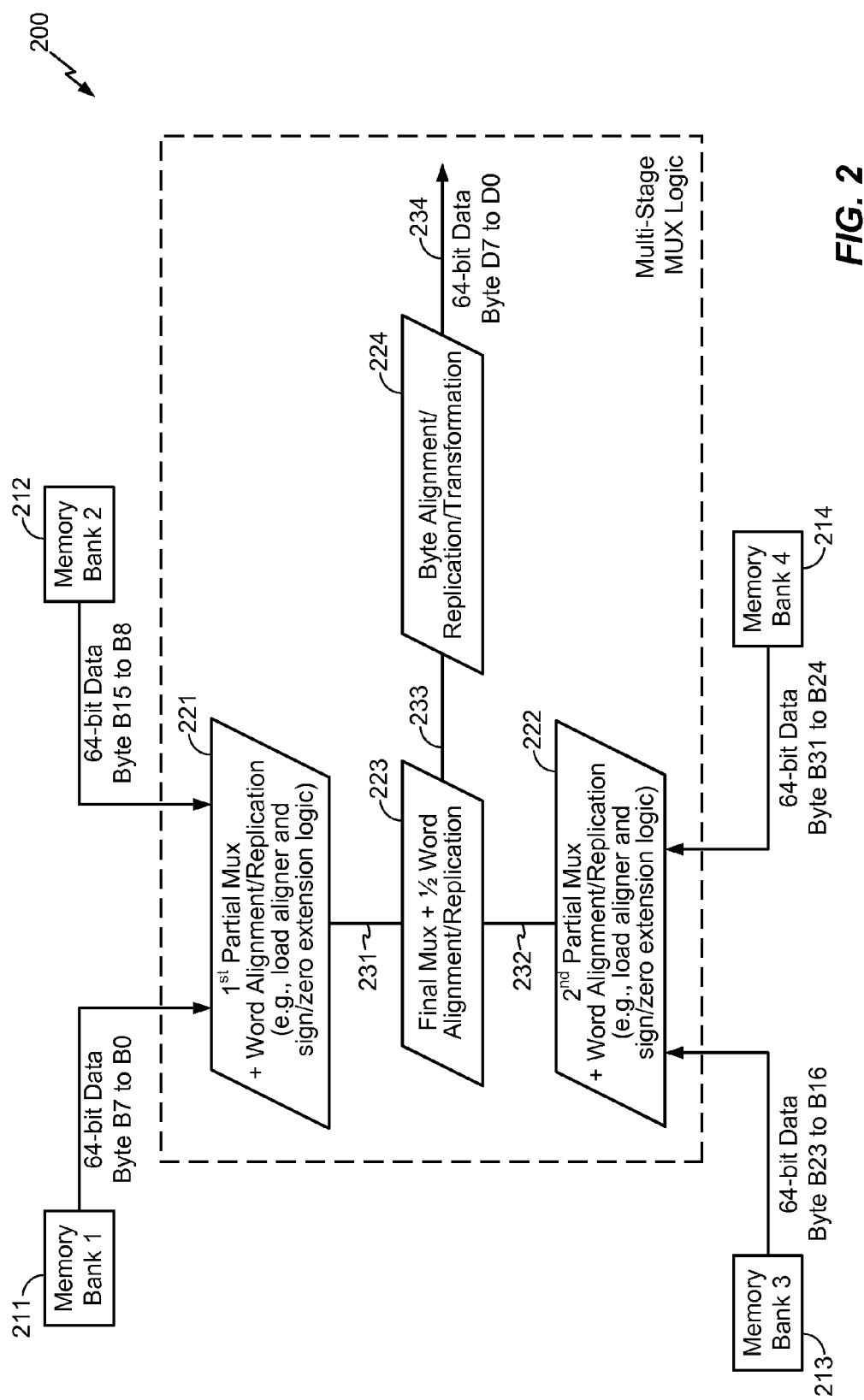
FIG. 2 is a block diagram of a particular illustrative embodiment of the multi-stage MUX logic of FIG. 1.

Referring to FIG. 2, a block diagram of a particular illustrative embodiment of the multi-stage MUX logic 120 of FIG. 1 is illustrated and designated 200. The logic 200 includes a first partial MUX 221 including word-level alignment and replication, a second partial MUX 222 including word-level alignment and replication, a final MUX 223 including half-word-level alignment and replication, and data manipulation logic 224 configured to perform byte-level alignment, replication, and transformation. The logic 200 may receive 64-bit data from each of four memory banks 211, 212, 213, 214 and may produce 64-bit data as an output. In an illustrative embodiment, the memory banks 211-214 are the memory banks 111-114 of FIG. 1.

The first partial MUX 221 may receive first 64-bit data from the first memory bank 211 and second 64-bit data from the second memory bank 212. For example, the first 64-bit data may be designated (in order from most significant byte to least significant byte) bytes B7-B0, and the second 64-bit data may be designated bytes B15-B8. The first partial MUX 221 may select from between the first 64-bit data and the second 64-bit data. The first partial MUX 221 may also perform word-level (i.e., 32-bit) alignment and replication on multiple segments of the selected 64-bit data. Thus, the first partial MUX 221 may produce as its output a first selected 64-bit double word 231 that is a word aligned/replicated representation of either bytes B7-B0 from the first memory bank 211 or bytes B15-B8 from the second memory bank 212. In a particular embodiment, the first partial MUX 221 is integrated into a load aligner, sign or zero extension logic, sign or zero padding logic, or any combination thereof. In another particular embodiment, the first partial MUX 221 includes a load aligner, sign or zero extension logic, sign or zero padding logic, or any combination thereof.

The second partial MUX 222 may operate in parallel (e.g., during the first stage) with the first partial MUX 221. The second partial MUX 222 may receive third 64-bit data from the third memory bank 213 and fourth 64-bit data from the fourth memory bank 214. For example, the third 64-bit data may be designated bytes B23-B16, and the fourth 64-bit data may be designated bytes B31-B24. The second partial MUX 222 may select from between the third 64-bit data and the fourth 64-bit data. The second partial MUX 222 may also perform word-level (i.e., 32-bit) alignment and replication on multiple segments of the selected 64-bit data. Thus, the second partial MUX 222 may produce a second selected 64-bit double word 232 that is a word aligned/replicated representation of either bytes B23-B16 from the third memory bank 213 or bytes B31-B24 from the fourth memory bank 214. In a particular embodiment, the second partial MUX 222 is integrated into a load aligner, sign extension logic, zero padding logic, or any combination thereof. In another particular embodiment, the second partial MUX 222 includes a load aligner, sign extension logic, zero padding logic, or any combination thereof.

The final MUX 223 may receive and select from between the first selected 64-bit double word 231 and the second selected 64-bit double word 232. The final MUX 223 may also perform half-word-level (i.e., 16-bit) alignment and replication. Thus, the final MUX 223 may produce an output of a 64-bit double word 233 that is a word/half-word aligned/replicated representation of one of bytes B7-B0, bytes B15-B8, bytes B23-B16, or bytes B31-B24.

The data manipulation logic 224 receives the 64-bit double word 233 from the final MUX 223 and may perform byte-level alignment, replication, and transformation on the 64-bit double word 233 to produce 64-bits of finalized output data 234. The 8 bytes of the finalized output data 234 may be designated bytes D7-D0.

A particular embodiment of operation of the logic 200 may be illustrated with reference to FIG. 3. In an illustrative embodiment, memory banks 311, 312, 313, 314 are the memory banks 211, 212, 213, 214 of FIG. 2, partial MUXs 321, 322 are the partial MUXs 221, 222 of FIG. 2, final MUX 323 is the final MUX 223 of FIG. 2, and data manipulation logic 324 is the data manipulation logic 224 of FIG. 2.

In a particular example, a microprocessor instruction may execute a logical OR operation between a byte operand and a particular byte 302 "E1" of data stored at the first memory bank 311. The particular bye 302 may be part of a first 64-bit double word 301 "F0E1D2C3B4A59687" as illustrated in FIG. 3. In a particular embodiment the particular byte 301 is retrieved and zero-padded to a least significant position before the logical OR operation occurs. For example, zero-padding prior to performing a logical OR may enable non-essential bits of an operand to "pass-through" the logical OR operation unchanged.

During a first stage of a multi-stage MUX operation, the first partial MUX 321 may receive the first 64-bit double word 301 from the first memory bank 311 and a may receive second 64-bit double word from the second memory bank 312. Because the desired byte 302 is in the first word "F0E1D2C3" of the first 64-bit double word 301, the first partial MUX 321 selects the first 64-bit double word 301 and performs word-level replication with respect to the first word of the first 64-bit double word 301. The first partial MUX 321 may produce a first selected 64-bit double word 331 "F0E1D2C3F0E1D2C3."

During a second stage of the multi-stage MUX operation, the final MUX 323 may receive the first selected 64-bit double word 331 from the first partial MUX 321 and a second selected 64-bit double word (not shown) from the second partial MUX 322. Because the desired byte 302 is in the third half-word "F0E1" of the first selected 64-bit double word 331, the final MUX 323 selects the first selected 64-bit double word 331 and performs half-word-level replication with respect to the third half-word of the first selected 64-bit double word 331. The final MUX 323 may produce as output a 64-bit double word 333 "F0E1F0E1F0E1F0E1."

During a third stage of the multi-stage MUX operation, the data manipulation logic 324 may perform other necessary data transformations with respect to the 64-bit double word 333. For example, the data manipulation logic 324 may zero-pad the 64-bit double word 333 to produce finalized output data 334 "00000000000000E1." The finalized output data 334 may then be used in the logical OR operation.

Figure 3:
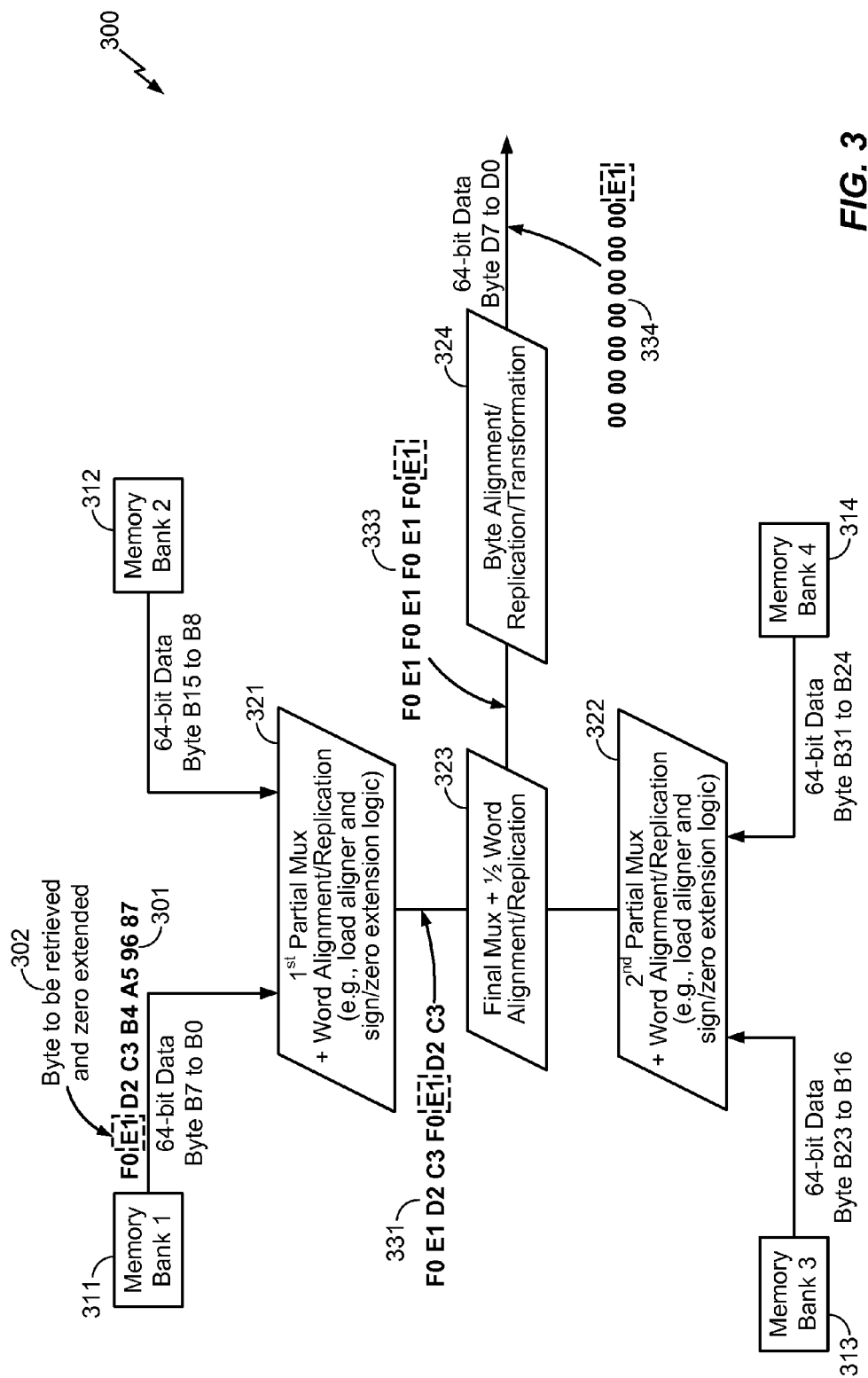
FIG. 3 is a block diagram to illustrate operation of the logic of FIG. 2.

It will be appreciated that the logic illustrated in FIG. 2 and FIG. 3 may integrate data retrieval/selection logic and data manipulation logic. It will thus be appreciated that the finalized output data 234 of FIG. 2 (334 of FIG. 3) may not require further manipulation prior to being operated on in accordance with a microprocessor instruction (e.g., logical OR).

Figure 4:
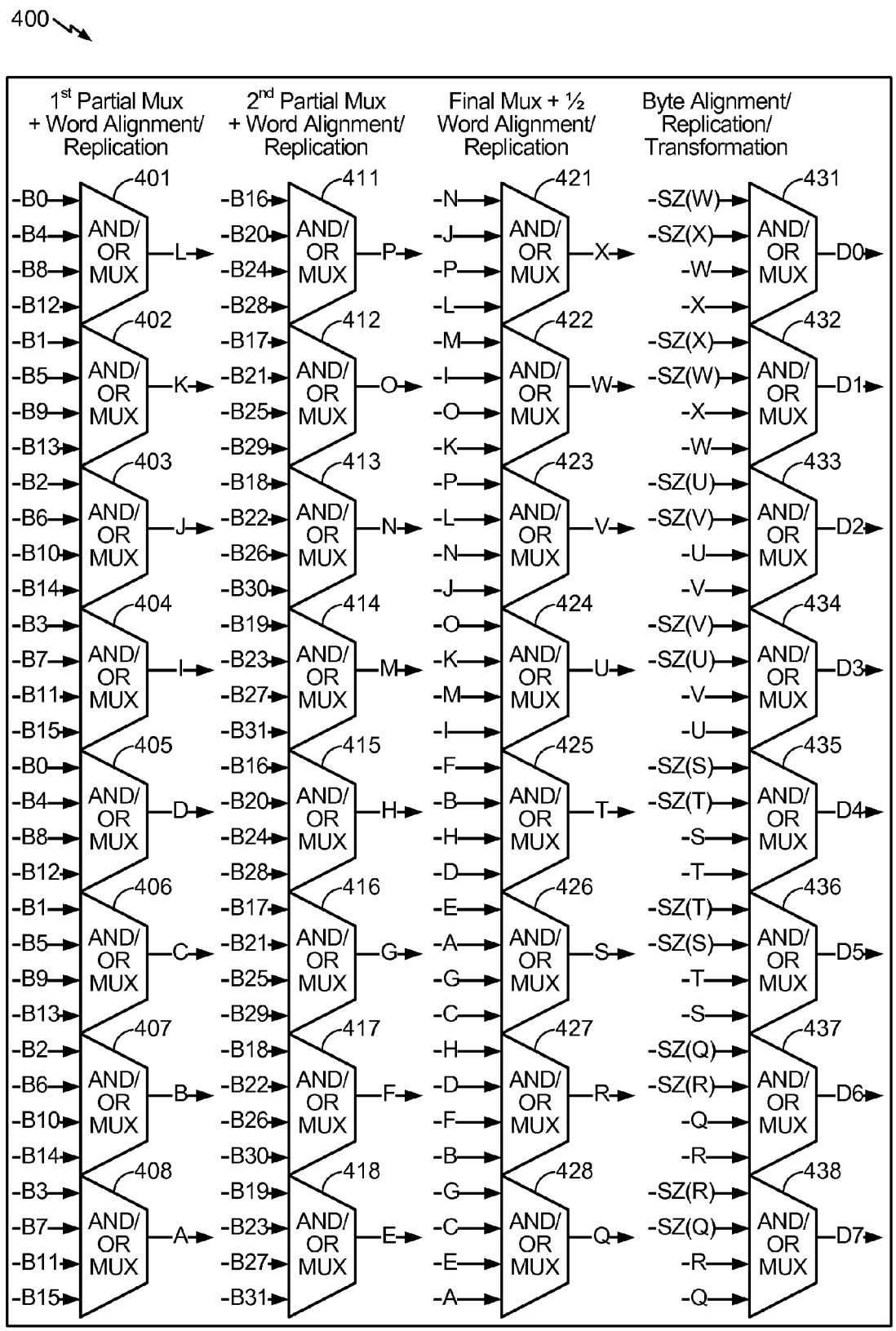
FIG. 4 is a circuit-level diagram of a particular illustrative embodiment of a circuit that includes the multi-stage MUX logic of FIG. 1 and the logic of FIG. 2.

Referring to FIG. 4, a circuit-level diagram of a particular illustrative embodiment of the multi-stage MUX logic 120 of FIG. 1 and the multi-stage MUX logic 200 of FIG. 2 is illustrated and generally designated 400.

In a particular embodiment, as illustrated in FIG. 4, multi-stage MUX logic that includes combined data selection and data alignment/replication may be implemented using and/or MUXs. For example, the first partial MUX 221 of FIG. 2 may be implemented using eight four-input and/or MUXs 401, 402, 403, 404, 405, 406, 407, and 408. The second partial MUX 222 of FIG. 2 may be implemented using eight four-input and/or MUXs 411, 412, 413, 414, 415, 416, 417, and 418. It should be noted that the input bytes from various memory banks may be spread across the various and/or MUXs 401-418. For example, the and/or MUX 401 may receive bytes B0 and B4 from the first memory bank 211 of FIG. 2 and bytes B8 and B12 from the second memory bank 212 of FIG. 2. As another example, the and/or MUX 418 may receive bytes B19 and B23 from the third memory bank 213 of FIG. 2 and bytes B27 and B31 from the fourth memory bank 214 of FIG. 2.

The final MUX 223 of FIG. 2 and the data manipulation logic 224 of FIG. 2 may also be implemented using and/or MUXs. For example, the final MUX 223 of FIG. 2 may be implemented using eight four-input and/or MUXs 421, 422, 423, 424, 425, 426, 427, and 428. Each input of each of the and/or MUXs 421-428 may be an output of one of the and/or MUXs 401-418. The data manipulation logic 224 of FIG. 2 may be implemented using eight four-input and/or MUXs 431, 432, 433, 434, 435, 436, 437, and 438. Each input of the and/or MUXs 431-438 may be an output of one of the and/or MUXs 421-428 or a sign-or-zero extended/sign or zero-padded ("SZ") version thereof. Each of the and/or MUXs 431-438 may produce one byte of finalized data D7-D0.

It should be noted that for the sake of clarity, not all connections of the circuit 400 are depicted. For example, although not connected in the illustration of FIG. 4, the output "A" of the and/or MUX 408 is input into both the and/or MUX 428 and the and/or MUX 426. It should further be noted that each byte-level and/or MUX depicted in FIG. 4 may include eight bit-level and/or MUXs. That is, each byte-level and/or MUX depicted in FIG. 4 may represent eight bit-level and/or MUXs, and each input bit may be applied to a different bit-level four-input and/or MUX.

When and/or MUXs are used to implement the multi-stage MUX logic 120 of FIG. 1, zero extension and zero padding may be performed by disabled or deasserting (e.g., setting to zero) all selects of a particular and/or MUX, thereby producing a zero value as output of the particular and/or MUX. Sign extension may be performed by designating one of the inputs to an 8-bit wide four-input and/or MUX as a sign bit and connecting the sign bit to all 8 bits of a particular input. Those 8 bits may then be selected (e.g., via a sign extender select) to extend the sign bit across the output of the and/or MUX.

It should be noted that a multi-stage multiplexing operation as described herein, or a portion thereof, may instead be implemented using other logic elements. For example, the first and second stage MUXs may instead be implemented using a pass gate four-to-one MUX instead of an and/or MUX. The third stage MUX may be implemented using a pass gate four-to-one MUX if zero padding and zero extension are not desired. If zero padding or zero extension is desired, the third stage MUX may instead be implemented by a five-to-one MUX with one of the five inputs set to zero. Sign extension may be performed by designating one of the inputs to an 8-bit wide pass gate four-to-one MUX as a sign bit and connecting the sign bit to all 8 bits of a particular input. Those 8 bits may be selected (e.g., via a sign extender select) to extend the sign bit across the output of the pass gate MUX. It should be noted that for pass gate MUXs one of the inputs is always asserted (e.g., one). Therefore, to generate a zero as the output of a pass gate MUX (e.g., for zero padding or zero extension), a zero may be connected to one of the inputs of the pass gate MUX. In another particular embodiment, only the third stage may be implemented using four-to-one and/or MUXs and the first two stages may be implemented using pass gate four-to-one MUXs.

A particular embodiment of operation of the circuit 400 of FIG. 4 may be illustrated with reference to FIG. 5. In an illustrative embodiment, and/or MUXs 511-518, 521-528, 531-538, and 541-548 are the and/or MUXs 411-418, 421-428, 431-438, and 441-448 of FIG. 4, respectively.

For example, as described with reference to the example of FIG. 3, a microprocessor instruction may execute a logical OR operation between a byte operand and a particular byte (e.g., "E1") stored at a 64-bit double word (e.g., "F0E1D2C3B4A59687") in memory. The particular byte may be retrieved, selected, and zero-padded by the circuit 500.

If bytes of the double word "F0E1D2C3B4A59687" are designated B7-B0, the desired byte "E1" is in the B6 position. Thus, during a first stage of a multi-stage MUX operation, the word "F0E1D2C3" may be selected and replicated by the and/or MUXs 501-508 as illustrated in FIG. 5, producing a first result double word "F0E1D2C3F0E1D2C3."

Figure 5:
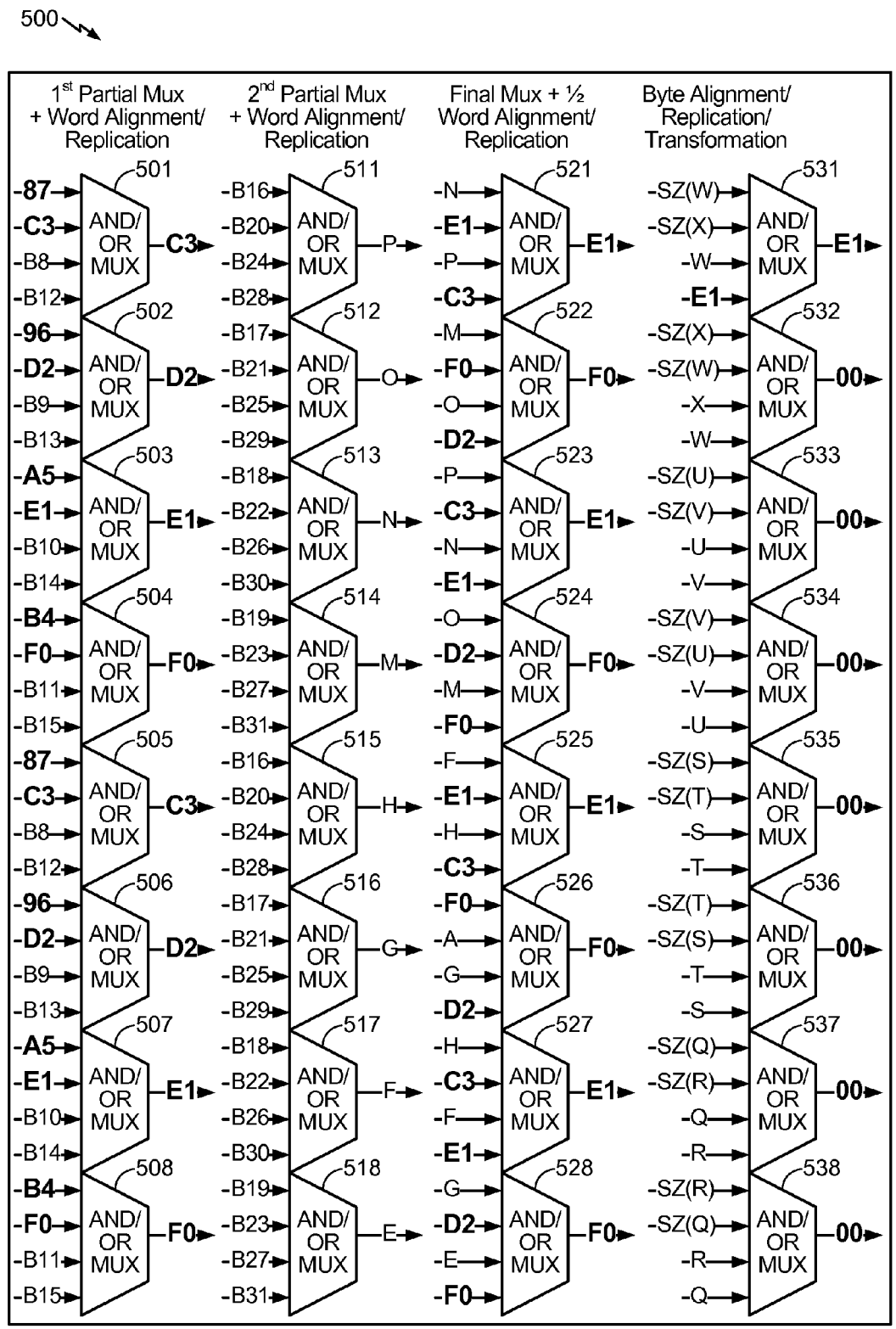
FIG. 5 is a circuit-level diagram to illustrate the operation of the logic of FIG. 2 as depicted in FIG. 3.

During a second stage of the multi-stage MUX operation, the half-word "F0E1" of the first result double word "F0E1D2C3F0E1D2C3" may be selected and replicated by the and/or MUXs 521-528 as illustrated in FIG. 5. A second result double word "F0E1F0E1F0E1F0E1" may thus be produced.

During a third stage of the multi-stage MUX operation, the second result double word "F0E1F0E1F0E1F0E1" may be zero-padded by the and/or MUXs 531-538 as illustrated in FIG. 5, thereby producing a finalized output double word "000000000000000E1."

It will be appreciated that the use of and/or MUXs as illustrated in FIGS. 4-5 may simplify logic at a microprocessor. For example, only one replicated gate structure may be placed in a 64-bit datapath of the microprocessor for each of the three multiplexing stages in the datapath.

Figure 6:
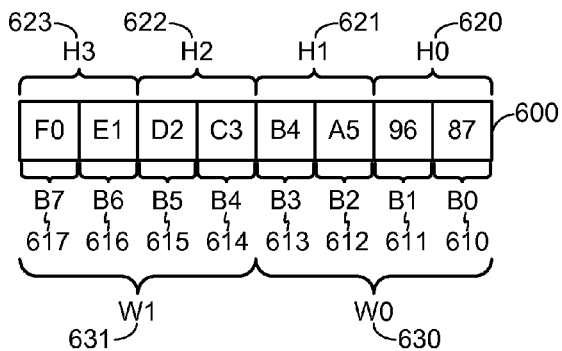
FIG. 6 is a diagram to illustrate particular embodiments of data access patterns supported by the multi-stage MUX logic of FIG. 1, the logic of FIG. 2, and the circuit of FIG. 4.
Figure 6:
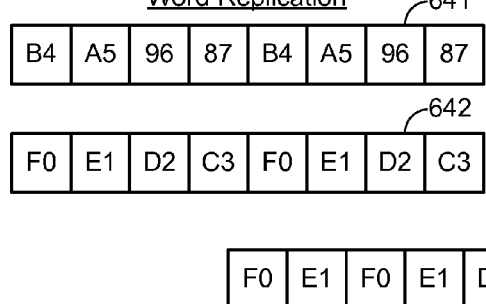
Figure 6:
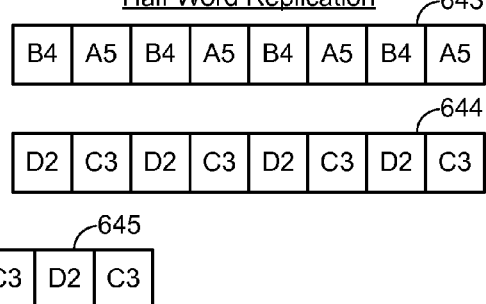
Figure 6:
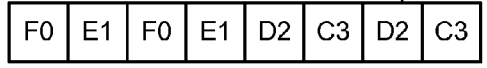
Figure 6:
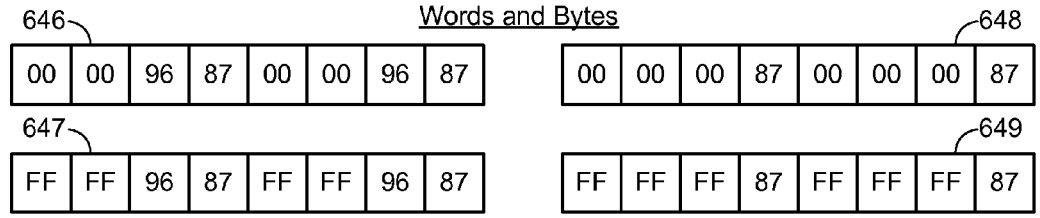
Figure 6:
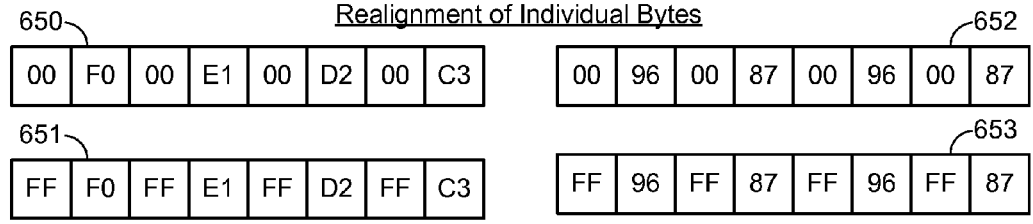

Referring to FIG. 6, particular embodiments of data access patterns with respect to an input double word 600 "F0E1D2C3B4A59687" are illustrated. As illustrated in FIG. 6, the input double word 600 may be divided into eight bytes B0-B7 610-617, four half-words H0-H3 620-623, or two words W0-W1 630-631.

As described with reference to FIGS. 4-5, many different variations of the input double word 600 "F0E1D2C3B4A59687" may be produced during a multi-stage MUX process. For example, word replicated variations may be produced. To illustrate, the double word 641 is word replicated with respect to the word W0 630 and the double word 642 is word replicated with respect to the word W1 631. Half-word replicated variations of the input double word 600 may also be produced. To illustrate, the double word 643 is half-word replicated with respect to the half-word H1 621 and the double word 644 is half-word replicated with respect to the half-word H2 622. The double word 645 may be produced by word replication followed by half-word replication.

Zero-padded and sign-extended variation of the input double word 600 may also be produced. For example, the double word 646 depicts the input double word 600 zero-padded at a half-word-level with respect to the half-word H0 620 and the double word 647 depicts the input double word 600 sign-extended at a half-word level with respect to the half-word H0 620. As another example, the double word 648 depicts the input double word 600 zero-padded at a byte-level with respect to the byte B0 610 and the double word 649 depicts the input double word 600 sign-extended at a byte-level with respect to the byte B0 610.

Particular bytes of the input double word 600 may also be individually realigned. For example, the double word 650 depicts zero padding and realignment with respect to individual bytes of the word W1 631 and the double word 651 depicts sign-extension and realignment with respect to individual bytes of the word W1 631. As another example, the double word 652 depicts zero padding and realignment with respect to individual bytes of the half-word H0 620 and the double word 653 depicts sign extension and realignment with respect to individual bytes of the half-word H0 620.

It will be appreciated that data manipulation as illustrated in FIG. 6 may be implemented by shifting data to the left, to the right, or a combination thereof. It will also be appreciated that data manipulation as illustrated in FIG. 6 may be performed on one or more of a double-word-level, a word-level, a half-word-level, or a byte-level. Thus, many different data access patterns may be supported by a multi-stage MUX operation as disclosed herein.

Figure 7:
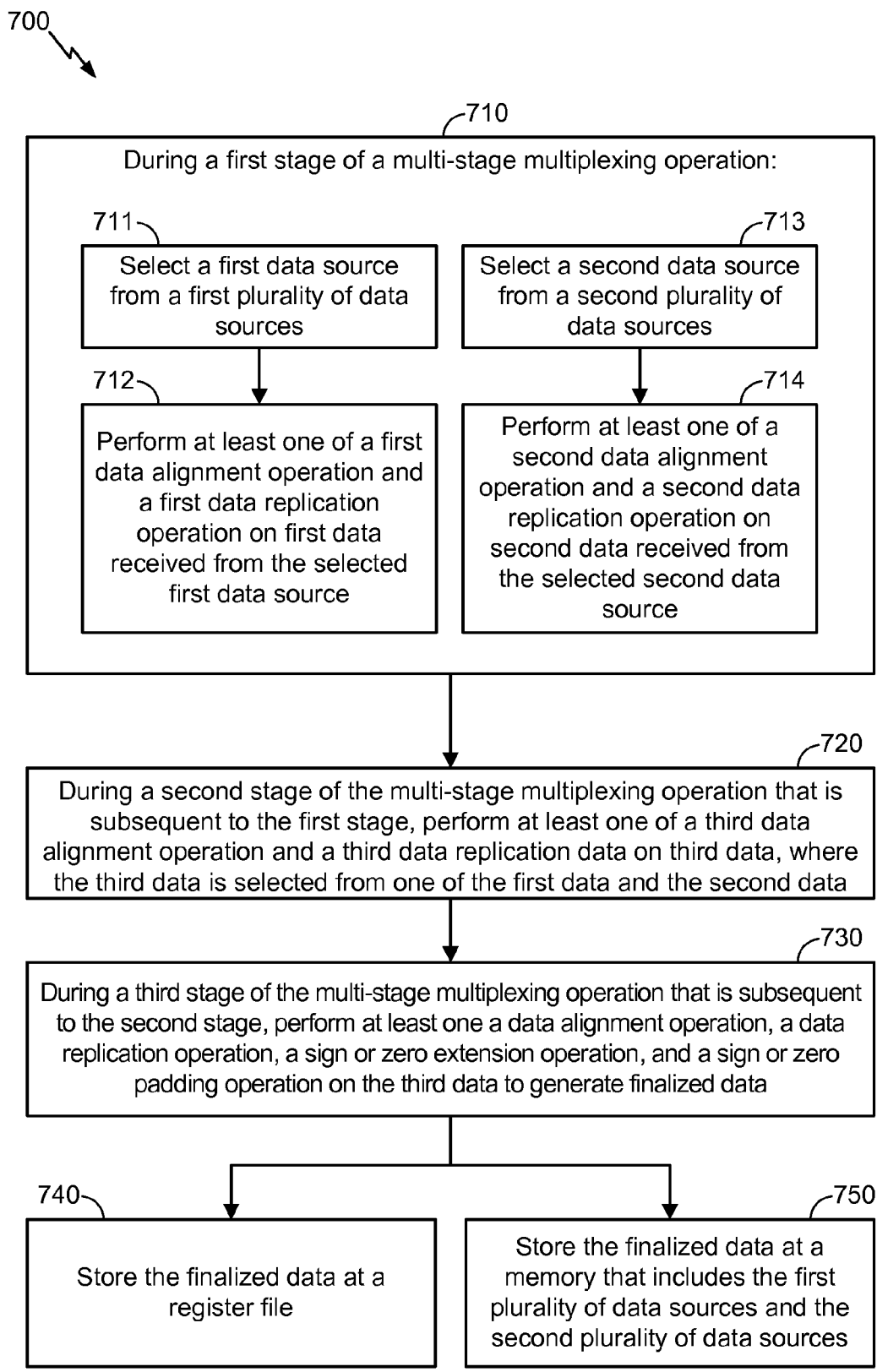
FIG. 7 is a flow chart of a particular illustrative embodiment of a method of performing a multi-stage multiplexing operation including combined data selection and data alignment or data replication.

Referring to FIG. 7, a flow chart of a particular illustrative embodiment of a method 700 of performing a multi-stage multiplexing operation including combined data selection and data alignment or data replication is depicted. In an illustrative embodiment, the method 700 may be performed by the system 100 of FIG. 1, the logic 200 of FIG. 2, or the circuit 400 of FIG. 4.

The method 700 includes performing a first stage of a multi-stage multiplexing operation, at 710. Performing the first stage includes selecting a first data source from a first plurality of data sources, at 711, and performing at least one of a first data alignment operation and a first data replication operation on first data received from the selected first data source, at 712. For example, in FIG. 2, the first partial MUX 221 may select the first memory bank 211 and may perform word-level alignment/replication on data received from the first memory bank 211.

Performing the first stage also includes selecting a second data source from a second plurality of data sources, at 713, and performing at least one of a second data alignment operation and a second data replication operation on second data received from the selected second data source, at 714. For example, in FIG. 2, the second partial MUX 222 may select the third memory bank 213 and may perform word-level alignment/replication on data received from the third memory bank 213.

The method 700 also includes, during a second stage of the multi-stage multiplexing operation that is subsequent to the first stage, performing at least one of a third data alignment operation and a third data replication operation on third data, at 720. The third data is selected from one of the first data and the second data. For example, in FIG. 2, the final MUX 223 selects and performs half-word-level alignment/replication on the first selected double word 231 received from the first partial MUX 221.

The method 700 further includes, during a third stage of the multi-stage multiplexing operation that is subsequent to the second stage, performing at least one of a data alignment operation, a data replication operation, a sign or zero extension operation, and a sign or zero padding operation on the third data to generate finalized data, at 730. For example, in FIG. 2, the data manipulation logic 224 may perform byte-level alignment, replication, and transformation to produce the finalized output data 234.

The method 700 includes storing the finalized data at a register file, at 740, or storing the finalized data at a memory, at 750. The memory may include the first plurality of data sources and the second plurality of data sources. For example, in FIG. 2, the finalized output data 234 may be stored at a register file or at a memory. In an illustrative embodiment, the finalized output data 234 is stored at a register file as described with reference to the register file 130 of FIG. 1 or at a memory as described with reference to the memory 110 of FIG. 1.

It will be appreciated that the method 700 of FIG. 7 may enable combined data selection and data manipulation (e.g., via alignment or replication) during various stages of a multi-stage MUX operation. It will thus be appreciated that the method 700 of FIG. 7 may reduce processor cycles to retrieve, select, and prepare data to be operated on in accordance with a microprocessor instruction.

Figure 8:
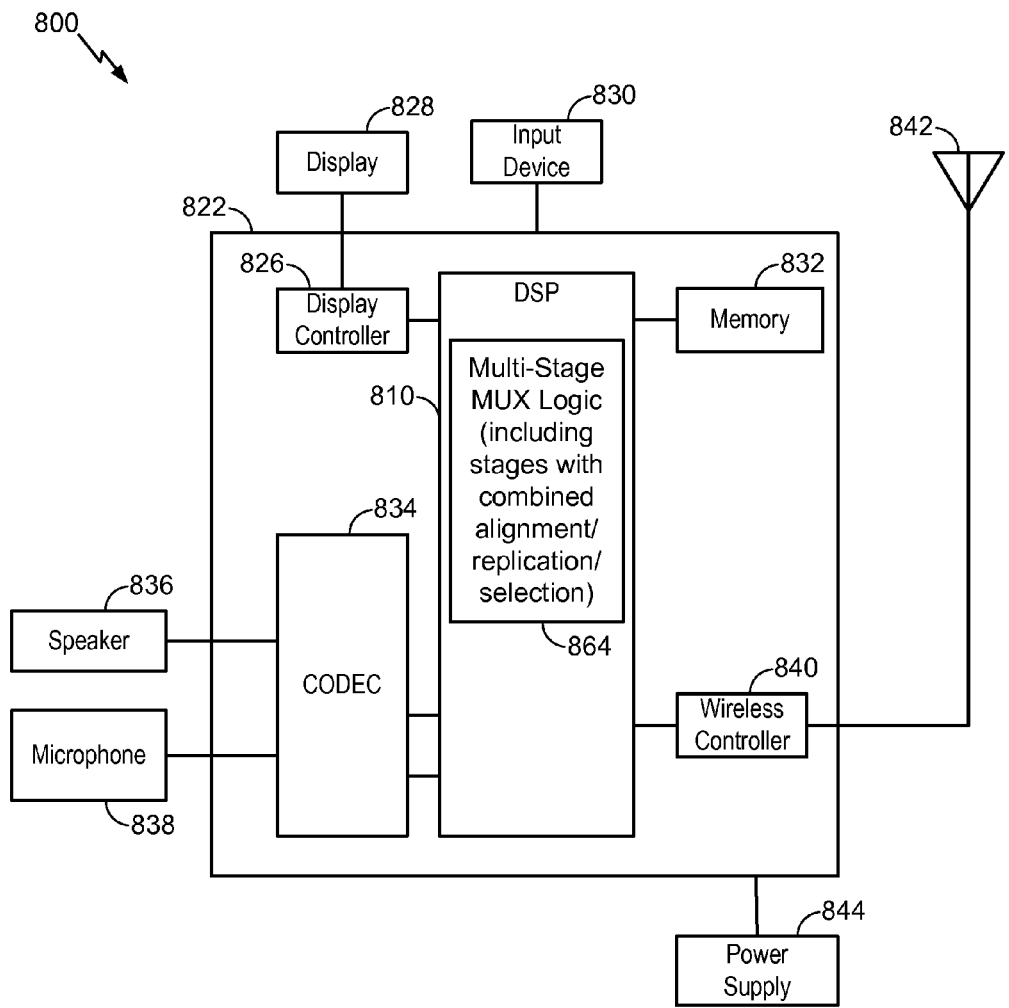
FIG. 8 is a block diagram of wireless device including a multi-stage multiplexing operation including combined data selection and data alignment or data replication.

Referring to FIG. 8, a block diagram of a particular illustrative embodiment of an electronic device operative to perform a multi-stage MUX operation including stages with combined alignment/replication/selection is depicted and generally designated 800. The device 800 includes a processor, such as a digital signal processor (DSP) 810, coupled to a memory 832. The digital signal processor 810 includes multi-stage MUX logic 864 including one or more stages with combined alignment/replication/selection. In an illustrative embodiment, the logic 864 includes one or more of the logic 120 of FIG. 1, the logic 200 of FIG. 2, and the circuit 400 of FIG. 4.

FIG. 8 also shows a display controller 826 that is coupled to the digital signal processor 810 and to a display 828. A coder/decoder (CODEC) 834 can also be coupled to the digital signal processor 810. A speaker 836 and a microphone 838 can be coupled to the CODEC 834.

FIG. 8 also indicates that a wireless controller 840 can be coupled to the digital signal processor 810 and to a wireless antenna 842. In a particular embodiment, the DSP 810, the display controller 826, the memory 832, the CODEC 834, and the wireless controller 840, are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the wireless antenna 842, and the power supply 844 are external to the system-on-chip device 822. However, each of the display 828, the input device 830, the speaker 836, the microphone 838, the wireless antenna 842, and the power supply 844 can be coupled to a component of the system-on-chip device 822, such as an interface or a controller.

In a particular embodiment, the device 800 is a communications device (e.g., wireless telephone), a music player, a video player, an entertainment unit, a navigation device, a personal digital assistant (PDA), or a computer. During operation, the DSP 810 may execute an instruction that includes retrieving and manipulating data from the memory 832. The multi-stage MUX logic 864 may include one or more stages that concurrently selects and manipulates data (e.g., via sign extension, zero padding, and word/half-word/byte replication). Upon completion of the multi-stage MUX operation, the data may be operated on in accordance with the instruction, and a result may be stored to the memory 832 or to register file of the DSP.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
receiving a first plurality of data; and
during a first stage of a multi-stage multiplexing operation:
selecting a first data from a the received first plurality of data; and
in parallel with selecting the first data, performing at least one of a first data alignment operation and a first data replication operation on the first data;
wherein the first data comprises a first 64-bit double word and wherein the at least one of the first data alignment operation and the first data replication operation is performed with respect to a 32-bit word of the first data.

2. The method of claim 1, further comprising during the first stage of the multi-stage multiplexing operation:
receiving a second plurality of data and
selecting a second data from the received second plurality of data; and
in parallel with selecting the second data, performing at least one of a second data alignment operation and a second data replication operation on the second data.

3. The method of claim 2, wherein the second data comprises a second 64-bit double word and wherein the at least one of the second data alignment operation and the second data replication operation is performed with respect to a 32-bit word of the second data.

4. The method of claim 2, further comprising during a second stage of the multi-stage multiplexing operation that is subsequent to the first stage:
performing at least one of a third data alignment operation and a third data replication operation on third data, wherein the third data is selected from an output of the first stage.

5. The method of claim 4, wherein the third data comprises a 64-bit double word and wherein the at least one of the third data alignment operation and the third data replication operation is performed with respect to a 16-bit half word of the third data.

6. The method of claim 4, further comprising during a third stage of the multi-stage multiplexing operation that is subsequent to the second stage:
performing at least one of a data alignment operation, a data replication operation, a sign extension operation, a zero extension operation, a sign padding operation, and a zero padding operation on the third data to generate finalized data.

7. The method of claim 6, further comprising during the third stage of the multi-stage multiplexing operation:
storing the finalized data in at least one of a register file and a memory.

8. The method of claim 7, wherein the memory comprises one or more of a first plurality of data sources for the first plurality of data and one or more of a second plurality of data sources for the second plurality of data.

9. The method of claim 6, wherein the finalized data comprises one or more of: a double word, two replicated words, at least two replicated half words, at least one sign extension byte, at least one zero extension byte, at least one sign padding byte, at least one zero padding byte, at least two replicated bytes, and at least one realigned byte.

10. The method of claim 1, wherein at least one data source of the first plurality of data is a first memory bank and at least one data source of the second plurality of data is a third memory bank.

11. The method of claim 1, wherein the performing the first data alignment operation comprises shifting the first data to the left or to the right.

12. The method of claim 1, wherein the performing the first data replication operation comprises replicating one or more segments of the first data.

13. An apparatus, comprising:
a memory comprising a plurality of data sources; and
a load aligner configured to receive a plurality of data from the plurality of data sources and, selectively perform at least one of a data alignment operation and a data replication operation on multiple segments of a double word retrieved from one of the received plurality of data concurrently with performing a multiplexing operation on the received plurality of data.

14. The apparatus of claim 13, wherein the load aligner is further configured to perform the data alignment operation by shifting data to the left or to the right.

15. The apparatus of claim 13, wherein each of the received plurality of data is a multi-byte data and wherein the load aligner is further configured to perform the at least one of the data alignment operation and the data replication operation on a bytewise basis.

16. The apparatus of claim 13, wherein selectively performing the at least one of the data alignment operation and the data replication operation concurrently with performing the multiplexing operation comprises inputting each bit of the double word into a four-input and-or multiplexer.

17. An apparatus, comprising:
a memory comprising a plurality of data sources; and
sign extension logic configured to receive a plurality of data from the plurality of data sources, and selectively sign extend multiple segments of a double word retrieved from one of the received plurality of data, wherein the sign extension is performed concurrently with a multiplexing operation on the received plurality of data.

18. The apparatus of claim 17, further comprising zero padding logic configured to selectively zero pad the multiple segments of the double word in parallel with the multiplexing operation.

19. The apparatus of claim 18, wherein each of the received plurality of data is a multi-byte data, wherein the sign extension logic is further configured to sign extend the multiple segments of the double word on a bytewise basis, and wherein the zero padding logic is further configured to zero pad each of the multiple segments of the double word on a bytewise basis.

20. The apparatus of claim 17, wherein selectively sign extending multiple segments of the double word in parallel with the multiplexing operation comprises inputting each bit of the double word into a four-input and-or multiplexer.

21. The apparatus of claim 17, wherein the double word comprises 64 bits.

22. An apparatus, comprising:
a plurality of means for storing data;
load aligner means for receiving a plurality of data from the plurality of means for storing data, and selectively performing at least one of a data alignment operation and a data replication operation on multiple segments of a double word retrieved from one of the received plurality of data in parallel with performing a multiplexing operation on the received plurality of data;
extension means for selectively sign extending or zero extending multiple segments of the double word in parallel with the multiplexing operation; and
padding means for selectively sign padding or zero padding the multiple segments of the double word in parallel with the multiplexing operation.

23. The apparatus of claim 22, further comprising a device selected from the group consisting of a music player, a video player, an entertainment unit, a navigation device, a communications device, a personal digital assistant (PDA), and a computer, into which the load aligner means, the sign extension means, and the zero padding means are integrated.

24. A non-transitory computer-readable medium comprising one or more microprocessor instructions, that when executed by a microprocessor, cause the microprocessor to:
execute a first stage of a multi-stage multiplexing operation comprising:
receiving a first plurality of data;
performing a first partial multiplexing operation comprising selecting a first data from the received first plurality of data; and
in parallel with selecting the first data, performing at least one of a first data alignment operation and a first data replication operation on the first data, wherein the first data comprises a first 64-bit double word and wherein the at least one of the first data alignment operation and the first data replication operation is performed with respect to a 32-bit word of the first data.

25. The non-transitory computer-readable medium of claim 24, wherein executing the first stage of the multi-stage multiplexing operation further comprises:
receiving a second plurality of data and
performing a second partial multiplexing operation comprising selecting a second data from the received second plurality of data; and
performing at least one of a second data alignment operation and a second data replication operation on the second data, wherein the at least one of the second data alignment operation and the second data replication operation is performed at a word level with respect to the second data.

26. The non-transitory The computer-readable medium of claim 25, wherein executing the one or more microprocessor instructions further causes the microprocessor to:
execute a second stage of the multi-stage multiplexing operation subsequent to execution of the first stage, comprising:
performing a multiplexing operation comprising selecting third data from an output of the first stage; and
performing at least one of a third data alignment operation and a third data replication operation on the third data, wherein the at least one of the third data alignment operation and the third data replication operation is performed at a half word level with respect to the third data.

27. The non-transitory computer-readable medium of claim 26, wherein executing the one or more microprocessor instructions further causes the microprocessor to:
execute a third stage of the multi-stage multiplexing operation subsequent to execution of the second stage, comprising:
performing at least one of a data alignment operation, a data replication operation, a sign extension operation, and a zero padding operation on a byte level with respect to the third data to generate finalized data; and
storing the finalized data in at least one of a register file and a memory.

28. The non-transitory computer-readable medium of claim 27, wherein the memory comprises the first plurality of data sources and the second plurality of data sources.

29. The non-transitory computer-readable medium of claim 24, wherein the one or more microprocessor instructions include a load instruction, a store instruction, or any combination thereof.

30. The non-transitory computer-readable medium of claim 29, wherein at least one of the one or more microprocessor instructions includes a memory address of data to be retrieved, a memory offset of data to be retrieved, a size of data to be retrieved, a sign extension bit, a zero extension bit, a sign padding bit, a zero padding bit, a left shift bit, a right shift bit, or any combination thereof.

* * * * *